3,469,482
MACHINE FOR CUTTING STRIP MATERIAL

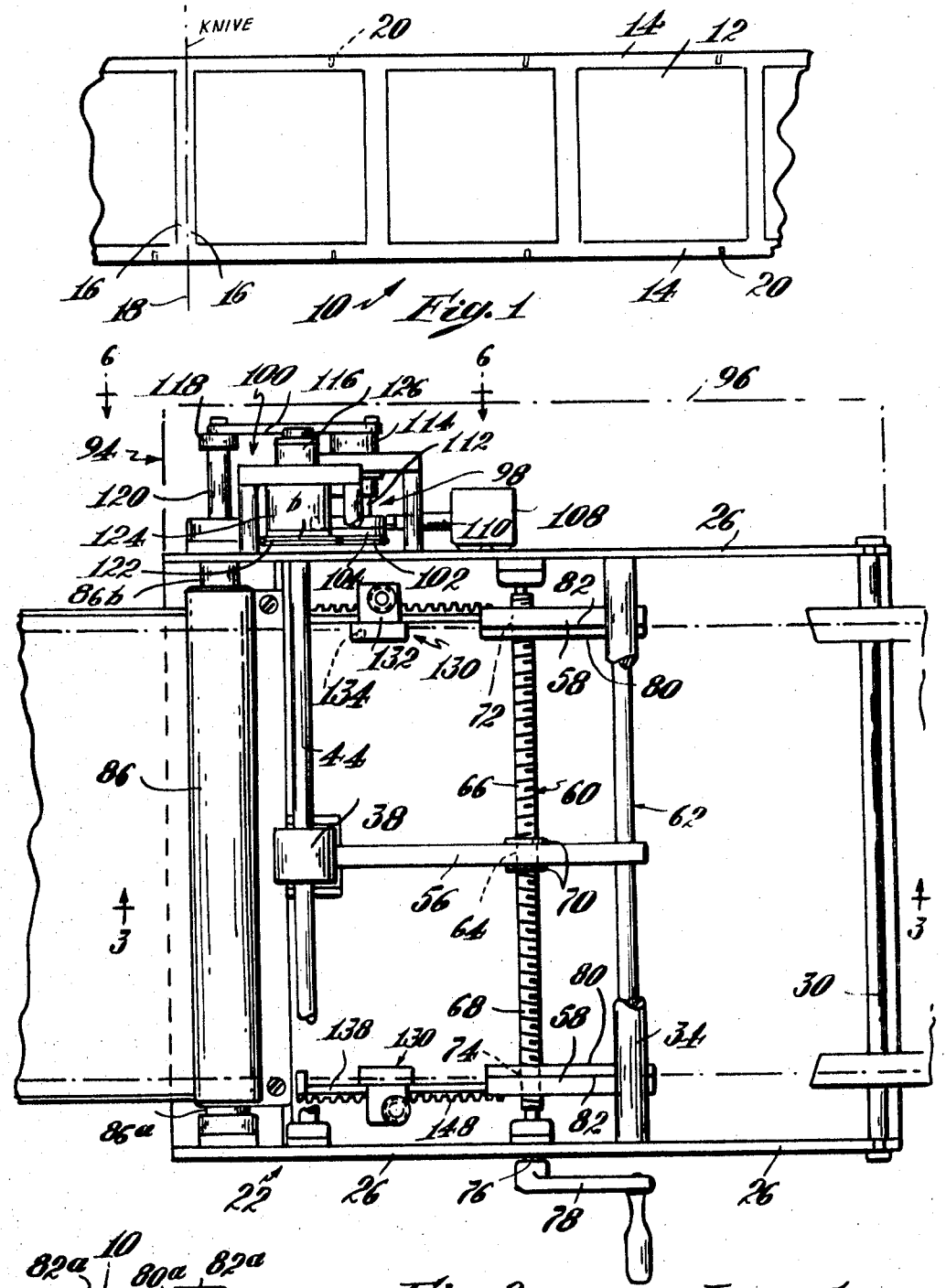

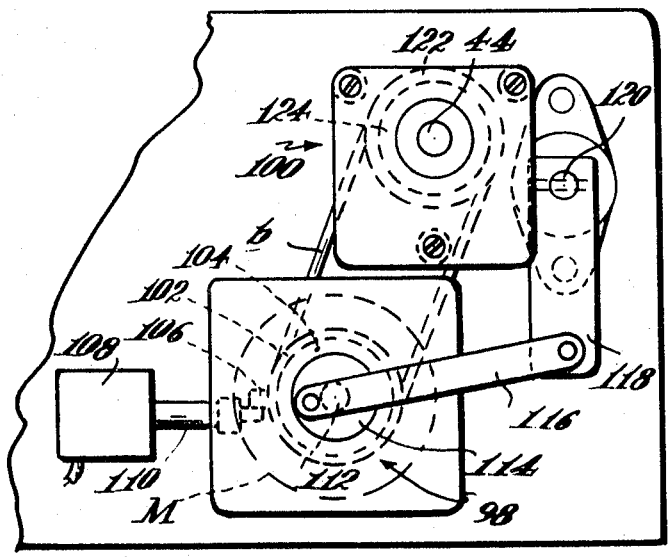
Fig. 6
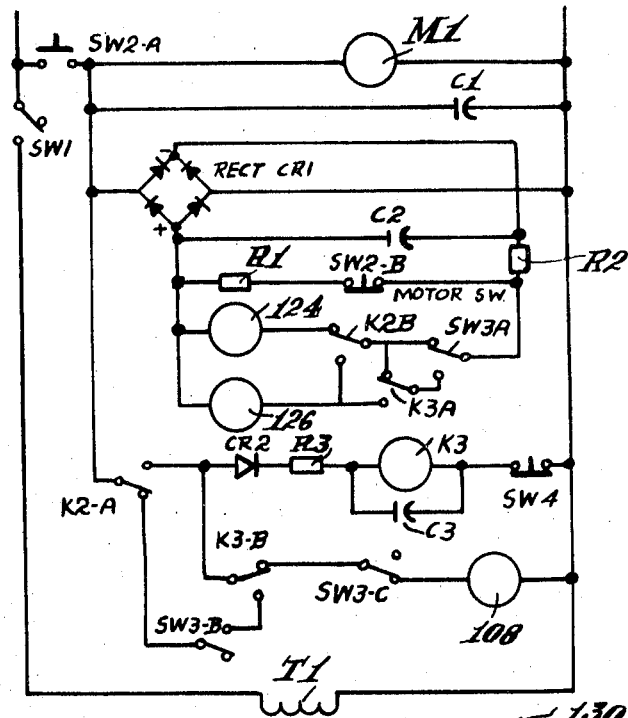
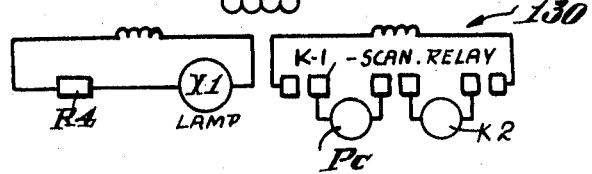
Fig. 7

Richard G. Lee, Weston, Mass., assignor, by mesne assignments, to Alves Photo Service, Inc., Braintree, Mass., a corporation of Massachusetts
Filed Nov. 30, 1966, Ser. No. 597,920
Int. Cl. B26d 5/32
U.S. Cl. 83—210                                9 Claims

ABSTRACT OF THE DISCLOSURE

A machine embodying a cutter, feed rolls for advancing a strip of processed photographic film to the cutter for cutting between successive prints and/or transparencies, a circuit including strip feeding means and strip cutting means, and sensing means responsive to indicia on the strip to control the circuit so that the cutting takes place between successive prints or transparencies.

---

The principal objects of the invention are to provide a machine in which closer control can be obtained between the feeding means and the cutting means so that each cut can be made at precisely the right position without overrun or underrun of the sheet material; to provide for feeding sheet material which has a sensitized or glossy surface without scratching the surface; to provide for cleaner cutting; to provide adjustments for accommodating sheet material of different widths; to provide for increasing or decreasing the cut lengths of the sheet material; to provide for feeding the sheet material without cutting; to provide for feeding and stopping the sheet material without cutting; and to provide a machine which is reliable and durable.

As herein illustrated, the cutting machine comprises a spindle supporting a length of sheet material, a cutter to which sheet material is delivered from the spindle for cutting transversely of its width, a one-revolution clutch operably connected to the cutter and operable to effect actuation of the cutter, a pair of feed rolls adjacent the cutter for drawing the sheet material from the spindle and delivering it to the cutter, an electrically operable combination clutch and brake assembly operably connected to the feed rolls operable, on the one hand, to drive the feed rolls and, on the other hand, to brake them to a stop, a sensing device located between the spindle and the feed rolls, said sensing device being responsive to a predetermined change in the character of the sheet material, and an amplifier circuit containing said sensing device and operable, in response to operation of the sensing device, simultaneously to declutch the clutch and activate the brake of the combination clutch and brake assembly and to actuate the one-revolution clutch. The feed rolls comprise a drive roll and an idler roll, and means urging the idler roll toward the drive roll. A common source of power in the form of a motor provides for effecting operation of the combined clutch and brake assembly and of the one-revolution clutch, and the circuit embodies means operable to maintain activation of the brake for a sufficient length of time to permit the one-revolution clutch to complete its revolution. There are transversely spaced edge guides adjacent the feed rolls for supporting the opposite edges of the sheet material, and means operably associated with the edge guides operable to decrease or increase the distance between them equal amounts. There are also supports situated along the path of movement of the sheet material between the spindle and the feed rolls comprising a centrally located rail, the upper surface of which is tangent to the nip of the feed rolls and transversely spaced rails, located at opposite sides thereof, with their upper surfaces in the plane of the central rail. There is means mounting the sensing means on one of the transverse supports for movement therewith, and means on the support for effecting movement of the sensing device along the path of movement of the sheet material relative to the cutter. The cutter comprises fixed and rotatable cutter bars situated adjacent the feed rolls. A stripper spaced from and parallel to the fixed cutter bar provides a guide slot through which the sheet material is moved into the sphere of action of the cutter bar. The motor, combined clutch and brake, one-revolution clutch and sensing means are embodied in a control circuit including means operable to de-activate the sensing means without interfering with continued operation of the feed rolls, and a cut switch operable to de-activate the one-revolution clutch without interfering with feeding and sensing.

The supports for the sheet material normally have a spacing corresponding to the width of the sheet material; however, alternatively, they may be adjusted to have a spacing which is less than the width of the sheet material for the purpose of holding the sheet material transversely arched, and to this end have horizontal and vertical surfaces adapted to support the edges of the sheet material with a portion intermediate the edges upwardly convex.

The invention will now be described in greater detail with reference to the accompanying drawings wherein:

FIG. 1 is a plan view of a length of sheet material of the kind which this machine is designed to cut;

FIG. 2 is a plan view of the machine with some of the parts shown in section and others broken away;

FIG. 2a is an elevation of a modification of the edge guide bars;

FIG. 6 is a fragmentary elevation taken on the line 6—6 of FIG. 2; and

Figure 3:
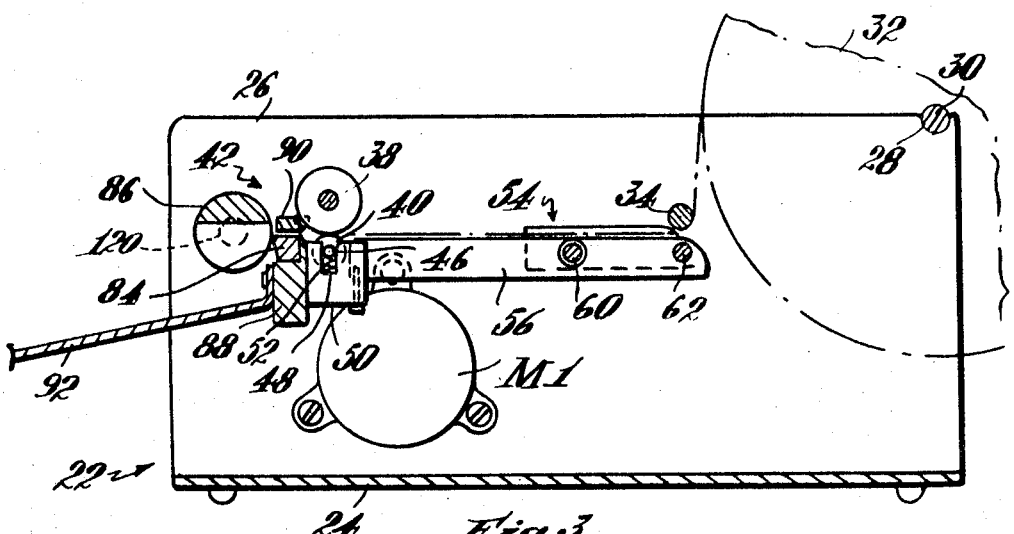
FIG. 3 is a longitudinal section taken on the line 3—3 of FIG. 2.
Figure 4:
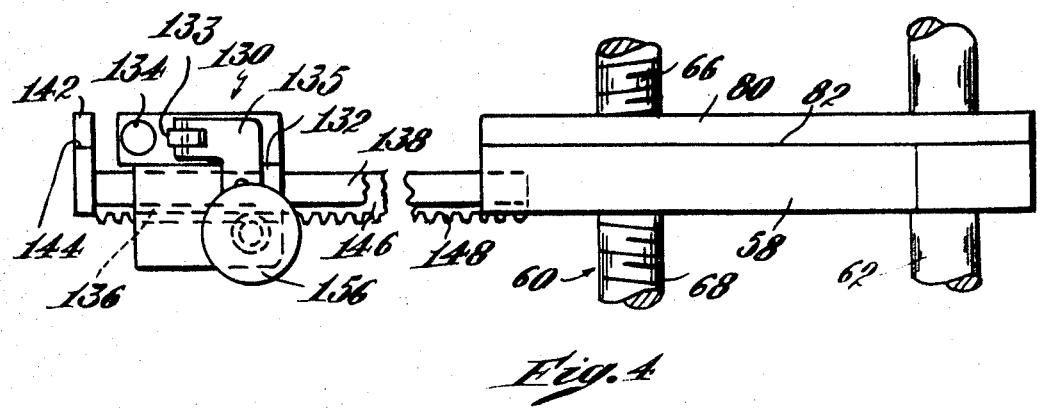
FIG. 4 is a plan view, to much larger scale, of the adjustment for the sensing means.
Figure 5:
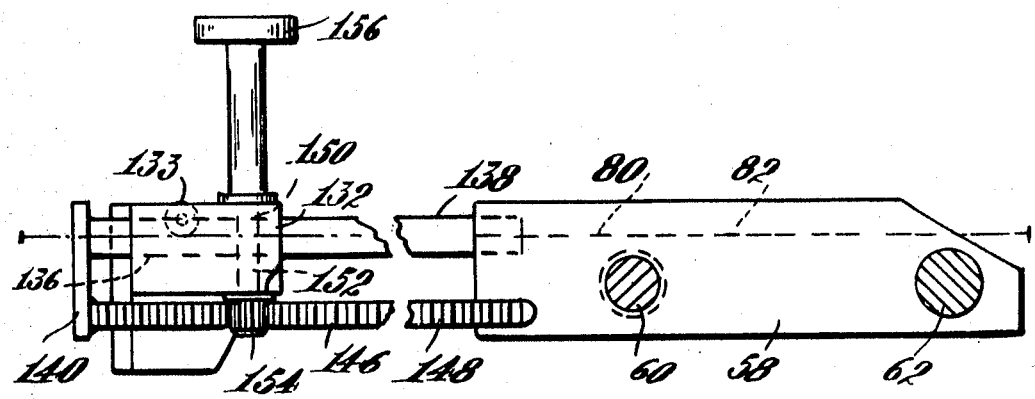
FIG. 5 is an elevation of FIG. 4.

FIG. 7 diagrammatically illustrates the control circuit.

Referring to the drawings (FIG. 1) there is shown sheet material 10 which is in the form of a sensitized film strip on which has been printed, at regularly spaced intervals, areas 12 with margins 14 at each of the parallel edges, and margins 16 between the areas 12 formed by cutting medially between successive areas on a line 18. To effect automatic cutting of sheet material of this kind indicia 20 is provided on one or both margins 14. The indicia may be applied to the top or bottom sides or may be photographed in the strip and viewed from either the top or bottom by direct or transmittent light. The indicia operates photoelectric means to stop the forward movement of the sheet material while the cut is being made.

The machine as herein illustrated comprises a frame 22 (FIGS. 2 and 3) of sheet metal having a base 24 and spaced parallel side walls 26 perpendicular thereto. At the rear end or right side, as illustrated in FIG. 3, the upper edges of the side walls 26 are provided with recesses 28 for receiving the opposite ends of a supporting spindle 30 on which is mounted a coil 32 of the sheet material which is to be cut up into individual frames or prints. The sheet material is led off the top of the coil and under a guide bar 34, the opposite ends of which are rotatably supported in the side walls 26, so that it is free to rotate as the sheet material passes under it. The sheet material is drawn forwardly from the guide bar 34 in a horizontal plane by feed rolls comprising a driven roll 38 and an idler roll 40 which deliver the sheet to cutting means 42. The driven feed roll 38 is transversely, relatively short, as shown in FIG. 2, so that it has contact with very little of the surface of the sheet material and is fixed for rotation to a shaft 44 journaled at its opposite ends in the side walls and driven as will appear hereinafter. The idler 40 is of substantially corresponding length and has gudgeons 46 at its ends, the latter being supported for movement toward and away from the shaft 44 in slots 48 formed in bracket plates 50 secured to the side walls. Coiled springs 52 situated between the bottoms of the slots 48 and the gudgeons 46 yieldably press the idler roll 40 against the feed roll 38 or the sheet material which is being advanced between them.

Between the guide bar 34 and the feed roll 38, the sheet material 10 is supported by guiding means 54 (FIGS. 2 to 5) comprising a centrally located guide bar 56 and transversely spaced guide bar 58. The guide bars 56 and 58 are supported by spaced parallel shafts 60 and 62 with the upper surface of the bar 56 in a horizontal plane tangent to the nip of the feed rolls. The shaft 60 has on it a smooth portion 64 on which the guide bar 56 is supported and retained by collars 70 at opposite sides so that it remains in a fixed position midway between the opposite sides of the machine. The shaft 60 also has on it right and left-hand threaded portions 66 and 68 which engage threaded openings 72 and 74 in the guide bars 58, so that by rotating the shaft 60 the guide bars 58 may be moved toward and away from the guide bar 56 to accommodate sheet material of different widths. The shaft 60 has a lateral extension 76 (FIG. 2) projecting through the side wall of the frame on which is mounted a crank 78 by means of which it may be rotated. Each of the guide bars 58 has a horizontal surface 80 located in the plane of the upper surface of the guide bar 56 and a vertical surface 82, the surfaces 80 and 82 in conjunction forming grooves which confine the edges of the sheet material.

The cutting means 42 comprises a rigid, fixed cutter bar 84 and a rigid, rotatable cutter bar 86 mounted transversely of the frame adjacent the feeding means for shearing the sheet material as it is advanced across the upper surface of the fixed cutter bar 84 into the sphere of action of the rotary cutter bar 86. The fixed cutter bar 84 (FIG. 3) is mounted on a support 88 fixed between the walls of the frame, and a stripper bar 90 is mounted above the bar 84 in spaced parallel relation thereto to support the sheet material at the instant of cutting so as to hold it uniformly flat during oscillation of the cutter bar 86. The cutter bar 86 is supported by a gudgeon 86a at one end and shaft 86b at the other end for rotation about its longitudinal axis and oscillation is effected, as will appear hereinafter, in timed relation with the feeding means so that cutting is effected each time the feeding means stops during normal operation of the apparatus.

The feed roll 38 and cutter bar 86 are driven by power-operable means 94 (FIGS. 2 and 6) which is mounted on the outer side of one of the walls 26 and enclosed within a cover 96 shown in dot and dash lines. The power-operable means embodies an electric motor M1, a one-revolution clutch 98 and a combined clutch and brake assembly 100. The motor M1 has on its shaft a pulley 102 and clutch disc 104 to which there is fixed a tooth 106. A solenoid 108 is mounted on the side wall 26 adjacent the clutch disc 104 and has a core rod 110 operable, by engagement with the tooth 106, to operably connect the motor shaft to a shaft 112 which, in turn, has on it an eccentric 114. One end of a link 116 is connected to the eccentric 114 and its opposite end is connected to a crankarm 118. The crankarm is secured to a shaft 120 and the latter is connected to the shaft 86b. The shaft 44 of the driven feed roll 38 extends through the side wall 26 and has mounted on it a pulley 122 which is adapted to be fixed thereto to effect rotation of the shaft 44 by a clutch 124 which comprises one component of an electric clutch and brake assembly 124, 126 which is electrically operable simultaneously to engage the clutch 124 with the shaft 44 and disengage the brake 126 therefrom, or disengage the clutch 124 and apply the brake 126. A belt b is entrained about the pulleys 102 and 122 so that the clutch component 124 is constantly rotated.

Operation of the one-revolution clutch and the combination clutch and brake assembly is controlled by a sensing means 130 (FIGS. 2 to 5) which is included in a control circuit (FIG. 7) to be described in greater detail hereinafter. The sensing means 130 is of the photoelectric variety and may be designed for either reflected light operation or transmitted light operation. As herein shown, the sensing means 130 is secured to a block 132 and contains an aperture 134 located in the plane of the upper surface 80 of the guide bars 58 so that the marginal edge of the sheet material will pass over the aperture, and as an indicia 20 intercepts the aperture will, through a conventional circuit, stop the feed and actuate the cutter. To insure accurate response to the indicia, a spring-pressed roller 133 (FIG. 4) is mounted by means of a spring arm 135 on the block 132 so as to have contact with the upper side of the sheet material at the margin to hold it firmly against the surface containing the aperture.

The photosensitive means specifically illustrated, embodies a lamp X1 which shines on the lower surface of the sheet material and is reflected back to a photocell Pc. The photosensing means may be used at one or both sides of the apparatus and is mounted for adjustment longitudinally of the direction of movement of the sheet material. To this end the block 132 contains a horizontal opening 136 (FIG. 4) for receiving a rod 138, one end of which is fixed in the guide bar 58 at that side in a horizontal position. The opposite end of the rod 138 has on it a plate 140 which is notched at its inner edge to provide a horizontal surface 142 situated in the plane of the surface 80 and a vertical surface 144 situated in the plane of the surface 82. A bar 146 is secured to the plate 140 at one end and at its opposite end to the guide bar 58 in parallel relation to the rod 138 and has on it a rack 148. The block 132 contains a vertical opening 150 (FIG. 5) in which is rotatably mounted a spindle 152, the lower end of which has fixed on it a gear 154 in mesh with the rack 148. The upper end of the spindle 152 has on it a knob 156 by means of which the gear 154 may be rotated to adjust the block 132 along the rod 138. Adjustment of the sensing device longitudinally enables controlling the length of the sheet material which will be advanced prior to operation of the cutter.

For certain operations, particularly where the sheet material to be processed has a sensitized surface or glossy surface which might be scratched by contact with the central guide bar 56, the machine is equipped with modified side guide bars 58a (FIG. 2a), each of which is provided with a horizontal surface 80a and in place of the vertical surfaces of the previously described guide bars inwardly inclined surfaces 82a, so as to form grooves of acute cross-section within which the marginal edges of the sheet material are adapted to be engaged. By adjusting the spacing of the guide bars 58a, the sheet material may be caused to arch upwardly so that the portion of the sheet material intermediate the edges is held away from the central guide bar 56 and thus cannot be scratched by contact therewith.

Referring to the control circuit (FIG. 7), there is a control switch SW1 for energizing a transformer T1. Energization of the transformer T1 energizes a lamp X1 providing a beam of light which will be reflected from the sheet material onto a photocell Pc. The sensing device 130 comprising a scanner relay K1, also energized by the transformer, provides power to the photocell Pc. A motor switch SW2–A is now pressed to initiate operation of the drive motor M1 which in turn, through the drive belt b entrained about the pulleys 102 and 122 rotate the latter on the shaft 44. The clutch 124 on the shaft 44 is energized at this time and turns the shaft 44 thus rotating the feed roll 38 in a direction to advance the sheet material. A cut switch SW3–C is set at the cut position as indicated and when an indicia 20 on the sheet material reaches the aperture 134 it changes the light intensity reaching the photocell Pc and through the amplifier K1 momentarily energizes a relay K2. Energization of relay K2 closes contact K2B, momentarily de-energizing the clutch 124 and energizing the brake 126. This stops the drive roll 38 from turning and prevents the sheet material from advancing while the cutter is operating. Contacts K2A are also operated momentarily, charging a capacitor C3. The cut solenoid 108 is also momentarily energized through contacts K2B, causing the linkage 116, 118 connecting the cutter bar to the solenoid to go through a cycle of operation and cut the sheet material. When the capacitor C2 is charged, relay K3 is energized and operates contacts K3B, preventing the cutter from cutting more than once. Contacts K3A also operate to prevent the clutch from immediately being re-energized when the relay K2 is de-energized. Following a short time delay, relay K2 is de-energized by amplifier K1 whereupon contacts K2B are operated, de-energizing the brake and re-energizing the clutch so that the drive roll 38 commences to advance the sheet material again. Contacts K2A are operated to de-energize relay K3. It is to be observed that the circuit includes a no-cut position of the cut switch SW3 so that the sheet material may be advanced without cutting by turning the control switch SW1 and motor switch SW2 on. When the feed button SW4 is pressed the sheet material will feed through the machine until the first indicia reaches the photocell whereupon the feed roll 38 will stop and the location of the print or frame relative to the cutter bar may be determined to see if the photocell is in the correct position. When the photocell is properly located the cut switch SW3 is turned on and the sheet material will advance and be cut until it is stopped. To stop the machine between successive lengths of sheet material, that is to enable replacing an empty spindle with a loaded spindle, the cut switch SW3 is merely turned off. To shut down the machine for non-use the cut switch SW3 should be turned off first and then the motor switch SW2 turned off.

It should be understood that the present disclosure is for the purpose of illustration only and that this invention includes all modifications and equivalents which fall within the scope of the appended claims.

I claim:

1. In a strip cutting machine, a spindle supporting a length of sheet material, a cutter to which sheet material is delivered from the spindle for cutting transversely of the width of the paper, a one-revolution clutch operably connected to the cutter and operable to effect actuation of the cutter, a pair of feed rolls adjacent the cutter for drawing sheet material from the spindle and delivering it to the cutter, supports situated along the path of movement of the paper from the reel to the feed rolls comprising a fixed centrally located rail, the upper surface of which is tangent to the nip of the feed rolls and transversely spaced rails located at opposite sides of the central rail having upper surfaces in the same plane as that of the center rail, means for effecting movement of the transversely spaced rails toward and away from each other equal amounts, an electrically operable combination clutch and brake assembly operably connected to the feed rolls operable on the one hand to drive the feed rolls and on the other hand to brake them to a stop, a sensing device located between the spindle and the feed rolls, said sensing device being responsive to change in the character of the paper, and an amplifier circuit containing said sensing device and operable in response to operation of the sensing device simultaneously to de-activate the clutch and activate the brake of the combined clutch and brake assembly and to activate said one-revolution clutch.

2. A strip cutting machine according to claim 1, wherein the control circuit contains a control switch operable to de-activate the sensing means without interfering with continued operation of the feed rolls.

3. A strip cutting machine according to claim 1, wherein the control circuit contains a cut switch operable to de-activate the one-revolution clutch without interfering with continued feeding and sensing.

4. In a strip cutting machine, a spindle supporting a length of sheet material, a cutter to which sheet material is delivered from the spindle for cutting transversely of the width of the paper, a one-revolution clutch operably connected to the cutter and operable to effect actuation of the cutter, a pair of feed rolls adjacent the cutter for advancing sheet material from the spindle and delivering it to the cutter, an elongate central support situated between the spindle and the feed rolls having an upper surface which is tangent to the nip of the feed rolls, transversely spaced supoprting means at opposite sides of the center support, each supporting means comprising an elongate rail adjacent the spindle having a flat upper surface in the same plane as the plane of the center support, a block adjacent the feed rolls having a horizontal upper surface tangent to the nip of the feed rolls and a vertical surface perpendicular thereto for engagement with an edge of the sheet material, means for moving the transversely spaced supporting means toward and away form the center support, an electrically operable combination clutch and brake assembly operably connected to the feed rolls operable on the one hand to drive the feed rolls and on the other hand to brake them to a stop, a sensing device located between the spindle and the feed rolls, said sensing device being responsive to change in the character of the paper, and an amplifier circuit containing said sensing device and operable in response to operation of the sensing device simultaneously to de-activate the clutch and activate the brake of the combined clutch and brake assembly and to activate said one-revolution clutch.

5. In a strip cutting machine, a spindle supporting a length of sheet material, a cutter to which sheet material is delivered from the spindle for cutting transversely of the width of the paper, a one-revolution clutch operably connected to the cutter and operable to effect actuation of the cutter, a pair of feed rolls adjacent the cutter for drawing sheet material from the spindle and delivering it to the cutter, transversely spaced supports in the form of rails having upper horizontal surfaces tangent to the nip of the feed rolls, means for simultaneously moving the rails toward and away from each other, an electrically operable combination clutch and brake assembly operably connected to the feed rolls operable on the one hand to drive the feed rolls and on the other hand to brake them to a stop, a sensing device located between the spindle and the feed rolls on one of the rails for movement therewith and for adjustment along the path of travel of the sheet material, said sensing device being responsive to change in the character of the paper, and an amplifier circuit containing said sensing device and operable in response to operation of the sensing device simultaneously to de-activate the clutch and activate the brake of the combined clutch and brake asembly and to activate said one-revolution clutch.

6. A strip cutting machine according to claim 5, comprising means on the guide rail or adjusting the sensing device.

7. A strip cutting machine according to claim 3, wherein the transversely spaced rails contain longitudinally extending, confronting re-entrant grooves within which the edges of the sheet material are supported with the portion therebetween arched.

8. A strip cutting machine, a spindle supporting a length of sheet material, a cutter to which the sheet material is delivered from the spindle for cutting transversely of the width of the paper, a one-revolution clutch operably connected to the cutter and operable to effect actuation of the cutter, a pair of feed rolls adjacent the cutter for drawing sheet material from the spindle and delivering it to the cutter, transversely spaced edge guides having edge supporting surfaces situated in a plane tangent to the nip of the feed rolls along with the strip is drawn by said feed rolls, an electrically operable combination clutch and brake assembly operable connnected to the feed rolls operable on the one hand to drive the feed rolls and on the other hand to brake them to a stop, sensing means mounted on one of the supports substantially in the plane of said supporting surface, spring-pressed means yieldably mounted on said one support above said supporting surface operable to hold the edge of the strip in intimate contact with the sensing means as the strip moves along said supporting surface, said sensing device being responsive to change in character of the paper, and an amplifier circuit containing said sensing device and operable in response to the operation of the sensing device simultaneously to de-activate the clutch and activate the brake of the combined clutch and brake assembly and to activate said one-revolution clutch.

9. A strip cutting machine according to claim 8, wherein said sensing device is a photoelectric cell containing an aperature in the plane of the supporting surface in communication with the sensitive element therein, and said spring-pressed means is a roll supported above the aperture for rolling contact with the strip as the latter is drawn beneath it.

References Cited

UNITED STATES PATENTS

| | | | |
|---|---|---|---|
| 2,133,868 | 10/1938 | Morton | 83—68 |
| 2,297,368 | 9/1942 | Rippl et al. | 83—349 X |
| 2,382,406 | 8/1945 | Engberg | 83—176 X |
| 2,759,504 | 8/1956 | Stooks | 143—37 X |
| 3,133,466 | 5/1964 | Seifert | 83—365 X |
| 3,174,374 | 3/1965 | Wick et al. | 83—210 |
| 3,203,293 | 8/1965 | Lee | 83—365 |

ANDREW R. JUHASZ, Primary Examiner

U.S. Cl. X.R.

83—68, 283, 365, 367, 449